United States Patent
Mysliwiec et al.

[11] Patent Number: 6,145,919
[45] Date of Patent: Nov. 14, 2000

[54] AUTOMATIC FOLDING ARMREST FOR SLIDING VEHICLE DOOR

[75] Inventors: Todd A. Mysliwiec, Allen Park; Carter S. Cannon, Southfield; Douglas J. Wilson, Burtchville; David Fu, Rochester Hills, all of Mich.

[73] Assignee: Lear Corporation, Southfield, Mich.

[21] Appl. No.: 09/258,362

[22] Filed: Feb. 26, 1999

[51] Int. Cl.⁷ .................................. B60J 9/00; B60J 5/06
[52] U.S. Cl. ........................................ 296/153; 296/155
[58] Field of Search ................................... 296/153, 155; 297/411.21

[56] References Cited

U.S. PATENT DOCUMENTS

| | | |
|---|---|---|
| 2,088,709 | 8/1937 | Lejuste . |
| 2,897,000 | 7/1959 | McBride et al. . |
| 3,155,421 | 11/1964 | Barneyi . |
| 3,594,036 | 7/1971 | Cadiou . |
| 4,453,760 | 6/1984 | Hira ............................................ 296/153 |
| 4,869,543 | 9/1989 | Grimes . |
| 4,880,778 | 11/1989 | Stephenson et al. .................... 297/417 |
| 5,010,996 | 4/1991 | Washburn . |
| 5,072,983 | 12/1991 | Muroi et al. ............................. 296/153 |
| 5,378,036 | 1/1995 | Townsend . |
| 5,524,960 | 6/1996 | Townsend . |
| 5,967,594 | 10/1999 | Ramanujam ............................ 296/153 |

FOREIGN PATENT DOCUMENTS

| | | |
|---|---|---|
| 1 552 061 | 9/1979 | United Kingdom . |
| WO 92/09451 | 6/1992 | WIPO . |

OTHER PUBLICATIONS

International Search Report, Jul. 7, 2000.

*Primary Examiner*—Joseph D. Pape
*Assistant Examiner*—Greg Blankenship
*Attorney, Agent, or Firm*—Brooks & Kushman P.C.

[57] ABSTRACT

A vehicle sliding door is movable in forward and rearward directions between opened and closed positions with respect to a vehicle body. The rear door has a cavity formed therein. An armrest is pivotally movable about a pivot axis between a horizontal position for use as an armrest and a vertical position for storage within the cavity. The pivot axis is substantially parallel to the forward and rearward directions. The armrest includes an actuator for automatically moving the armrest between the vertical and horizontal positions as the door moves between the opened and closed positions, respectively. The actuator may comprise a pneumatic drive system, a flexible drive cable or an electric motor for automatically pivoting the armrest between stowed and use positions.

12 Claims, 5 Drawing Sheets

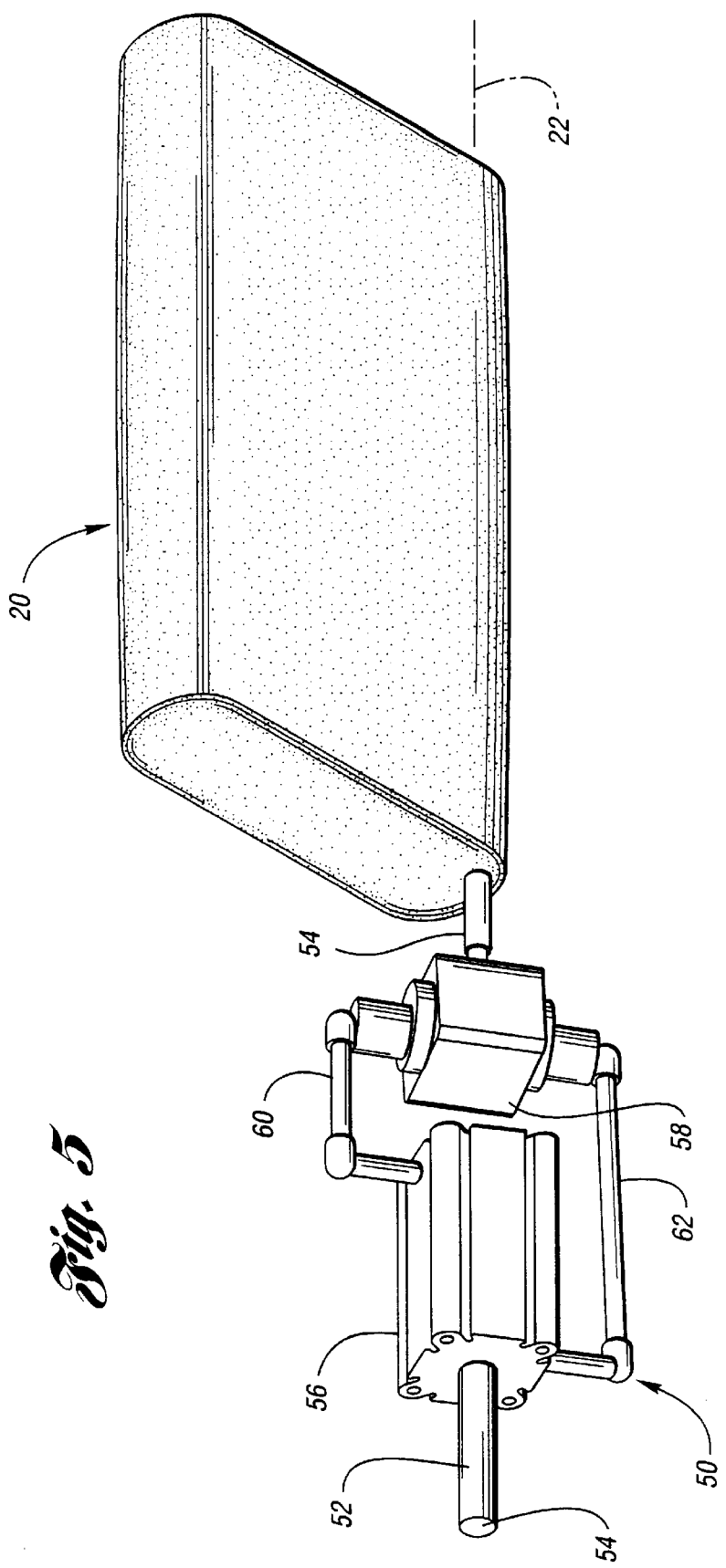

AUTOMATIC FOLDING ARMREST FOR SLIDING VEHICLE DOOR

TECHNICAL FIELD

The present invention relates to an automatic folding armrest for a sliding vehicle door in which the armrest is automatically movable between a horizontal position for use and a vertical position for storage within a cavity formed in the door.

BACKGROUND ART

Sliding rear doors have become a popular design feature in vans and minivans. Sliding rear doors of minivans typically do not have an armrest for the rear passengers due to the packaging problems associated with door movement. When the door is opened, the clearance between the inner door trim and the outer body of the vehicle may be reduced to approximately 20 millimeters or less in many vehicle designs. This clearance simply does not provide enough space for an operative armrest. It is not desirable to increase the clearance between the inner door trim and the outer body of the vehicle because larger, heavier tracking components and door components would be required to accommodate such movement. Such structure would add weight and cost to the vehicle design.

U.S. Pat. No. 3,594,036 describes an armrest operative for use with a sliding door wherein the armrest is pivotally connected to the vehicle body and is engaged by a component of the sliding door to automatically pivot the armrest to a vertical, non-use position when the door is open to allow ingress and egress of passengers. However, this design is somewhat bulky and may not be aesthetically pleasing. Additionally, this design would be difficult to reconfigure for use in a minivan as a result of the seat and door positioning, and the fact that minivan doors are slid on the outside of the vehicle body, as opposed to the interior of the frame as taught in the '036 patent.

Accordingly, it is desirable to provide an armrest for a rear sliding door of a vehicle, such as a minivan, which accommodates minimal clearance between the door trim and the vehicle outer body when the door is opened.

DISCLOSURE OF INVENTION

The present invention overcomes the above-referenced shortcomings of prior art vehicle sliding door designs by providing a vehicle sliding door having a cavity formed therein with an armrest pivotally movable with respect to the cavity between a horizontal use position and a vertical storage position within the cavity. The armrest includes an actuator for automatically pivoting the armrest to the horizontal use position when the door is closed.

More specifically, the present invention provides a vehicle including a vehicle body and a sliding rear door movable in forward and rearward directions between open and closed positions with respect to the vehicle body. The rear door includes a cavity formed therein. An armrest is pivotally movable about a pivot axis between a horizontal position for use as an armrest and a vertical position for storage within the cavity. The pivot axis is substantially parallel to the forward and rearward directions. The armrest includes an actuator for automatically moving the armrest between the vertical and horizontal positions as the door moves between the open and closed positions, respectively.

In one embodiment, the actuator includes a pneumatic drive mechanism having a protruding piston engageable with the vehicle body when the door is moved to the closed position for automatically pneumatically actuating rotation of the armrest about the pivot axis to the horizontal position. The protruding piston is spring-biased toward an extended position corresponding with the armrest being in the vertical position so that the armrest automatically returns to the vertical position as the protruding piston is disengaged from the vehicle body.

In another embodiment, the actuator comprises a flexible drive cable engaged at one end with the armrest for pivoting the armrest as the cable rotates, and at another end to a rotatable drive gear engageable with the vehicle body for rotating the drive cable as the sliding door is moved forward and rearward.

In another alternative embodiment, the actuator comprises a 12 volt d.c. motor and mating electrical connectors on the door and B-pillar which are operative to energize the motor to pivot the armrest to the horizontal use position when the connector is engaged. The armrest may be spring-loaded toward the vertical storage position when the electrical connectors disengage, or the motor may be reversed to return the armrest to the vertical position.

Accordingly, an object of the invention is to provide a vehicle armrest on a sliding rear door which accommodates minimal clearance between the door trim and the outer vehicle body as the door is opened.

The above object and other objects, features and advantages of the present invention are readily apparent from the following detailed description of the best modes for carrying out the invention when taken in connection with the accompanying drawings.

BRIEF DESCRIPTION OF DRAWINGS

FIG. 5 shows a perspective view of an actuator and foldable armrest in accordance with an alternative embodiment of the invention;

BEST MODE FOR CARRYING OUT THE INVENTION

Figure 1:
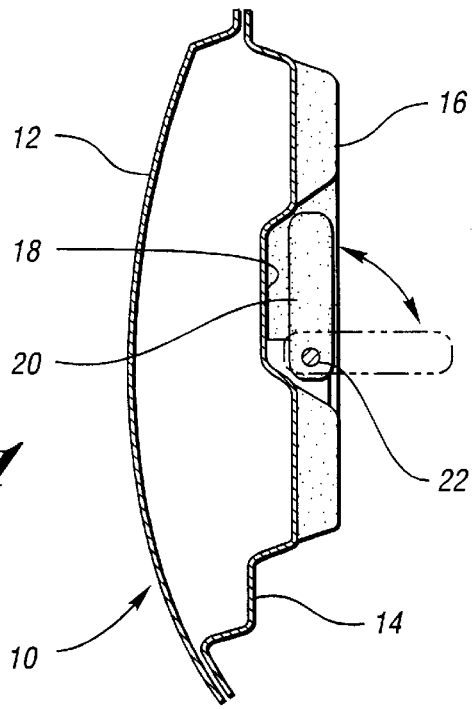
FIG. 1 shows a schematic elevational cross-section of a sliding vehicle door incorporating an automatic folding armrest in accordance with the present invention.
Figure 2:
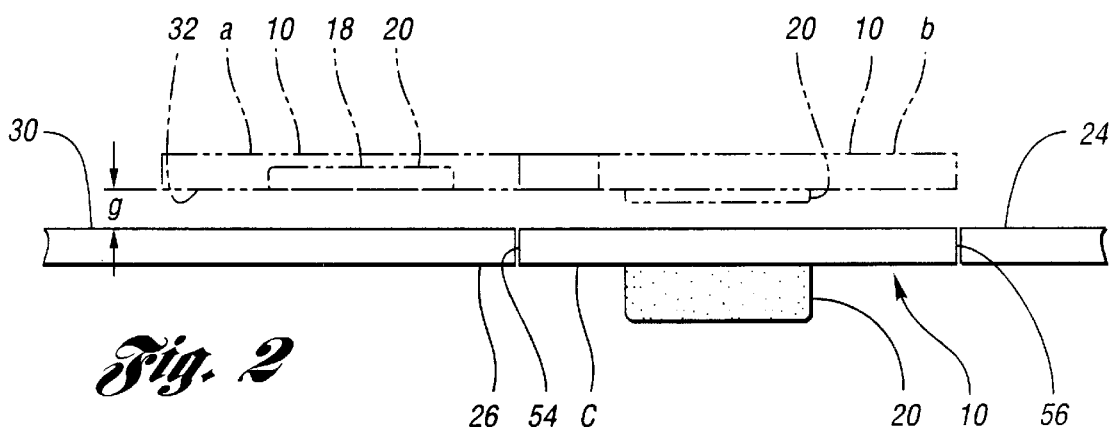
FIG. 2 shows a schematic horizontal cross-sectional view of the door of FIG. 1 in various positions with respect to a vehicle body.

Referring to FIGS. 1 and 2, a sliding rear door 10 is shown in a vehicle. As shown in FIG. 1, the door 10 includes a door outer 12, door inner 14, and door trim 16. The door trim 16 and the door inner 14 cooperate to form a cavity 18 for pivotally receiving the armrest 20.

The armrest 20 is pivotable about the pivot axis 22 between the vertical position of FIG. 1 for storage within the cavity 18, and the horizontal position, shown in phantom in FIG. 1, for use as an armrest when the door 10 is closed. The pivot axis 22 is substantially parallel to the directions of forward and rearward movement of the door 10, which is into and out of the page as viewed in FIG. 1, and left and right as viewed in FIG. 3. Of course, the pivot axis 22 could alternatively be positioned at the top of the cavity 18 so that the armrest pivots downward.

Figure 2A:
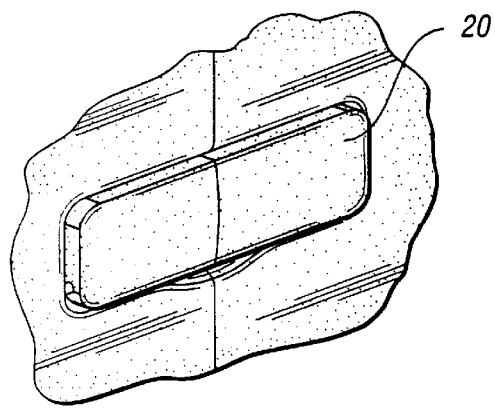
FIG. 2a shows a schematic perspective view of the armrest of FIG. 1 in the vertical storage position.

Turning to FIG. 2, the door 10 is shown positioned between a B-pillar 24 and a C-pillar 26 of a vehicle body. In the position c shown in FIG. 2, the door 10 is in the closed position between the B-pillar 24 and C-pillar 26, and the armrest 20 is in the horizontal use position for use as an armrest. Position c shown in FIG. 2 corresponds with FIG. 2c which shows the armrest 20 in the horizontal use position.

Figure 2B:
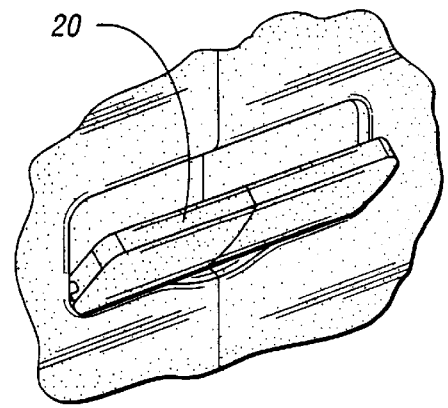
FIG. 2b shows a schematic perspective view of the armrest of FIG. 1 moving between the vertical and horizontal positions.
Figure 2C:
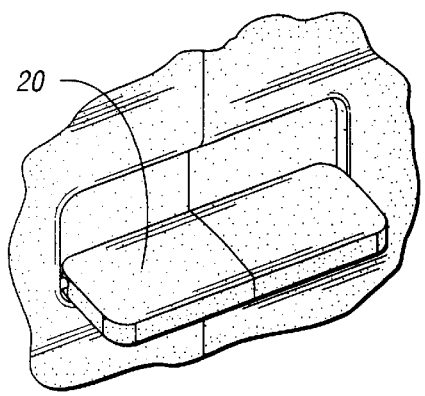
FIG. 2c shows a schematic perspective view of the armrest of FIG. 1 in the horizontal use position.

At position b, shown in FIG. 2b, and shown in phantom in FIG. 2, the door 10 is translating between the open and closed positions. As shown, the armrest 20 has partially pivoted between the vertical and horizontal positions.

With the door 10 in the fully open position, shown as phantom position a in FIG. 2, and shown in FIG. 2a, the armrest 20 is in the vertical position within the cavity 18 so that a minimal clearance gap g is maintained between the outer surface 30 of the vehicle body, and the inner surface 32 of the door trim 16.

Figure 4:
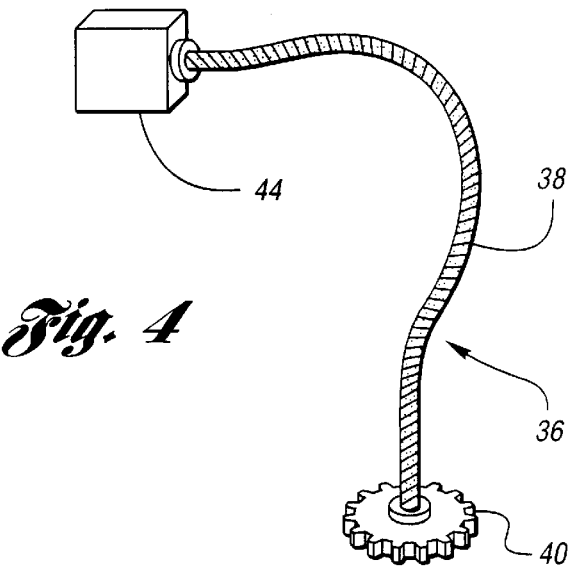
FIG. 4 shows a schematic perspective view of the actuator of FIG. 3.
Figure 3:
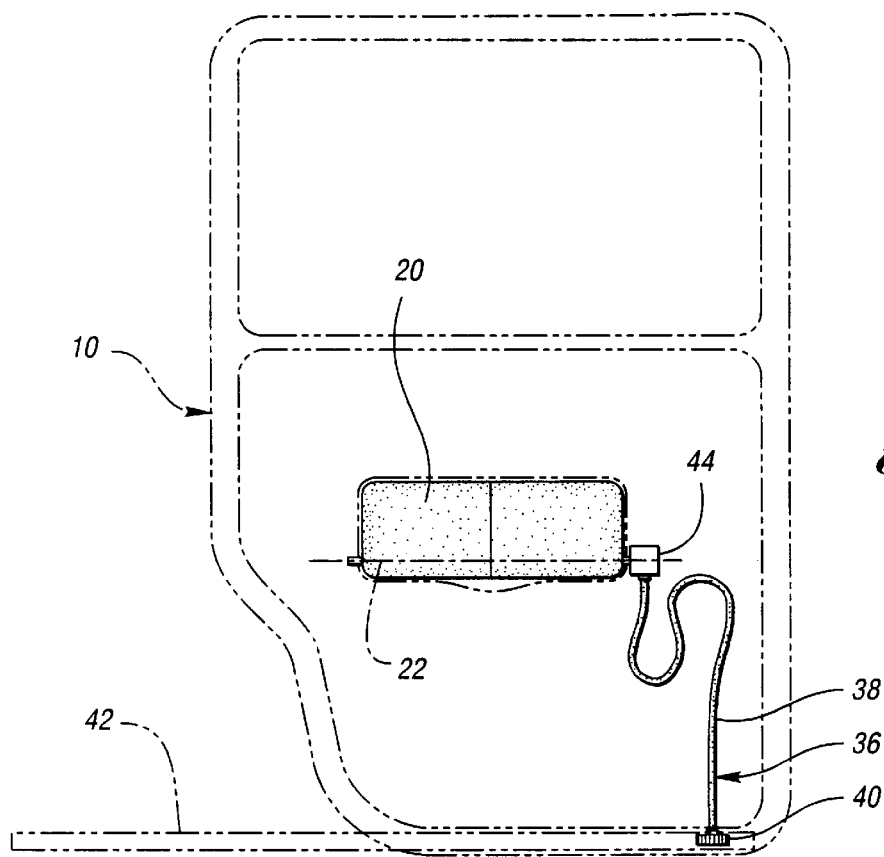
FIG. 3 shows a side view of the door of FIG. 1 incorporating a schematically displayed actuator for pivoting the armrest.

Referring to FIGS. 3 and 4, an actuator 36 is shown for automatically pivoting the armrest 20 between the vertical and horizontal positions. As shown, the actuator 36 comprises a flexible drive cable 38 with a rotatable drive gear 40 at one end which is engageable within a rack associated with a guide track 42 which guides sliding movement of the door 10. Accordingly, as the door 10 is slid back and forth along the track 42, the gear 40 is rotated to rotate the flexible drive cable 38, which rotates the drive gear 44 for pivoting the armrest 20 about the pivot axis 22. Accordingly, in this configuration, the armrest 20 is automatically pivoted between the vertical and horizontal positions as the door 10 is slid forward and rearward along the track 42.

Turning to FIG. 5, a perspective view of an actuator 50 is shown in accordance with an alternative embodiment of the invention for rotating the armrest 20 between the vertical and horizontal positions. As shown, the actuator 50 comprises a pneumatic drive system having a protruding piston 52 which is engageable with either the B-pillar 24 or C-pillar 26 of the vehicle body, shown in FIG. 2, when the door 10 is in the closed position. Of course, the piston 52 could be engaged with any body component for operation.

The actuator 50 is positioned at either end 54,56 of the door 10, shown in FIG. 2, with the piston 52 protruding therefrom for engagement against the B-pillar 24 or C-pillar 26. The armrest 20 is connected to a rotatable shaft 55 for rotating the armrest 20 about the pivot axis 22. The shaft 55 is attached to the rotary actuator mechanism 50.

The protruding piston 52 includes a spring-return air cylinder, which is spring biased toward an extended position away from the housing cylinder 57, which corresponds with the vertical position of the armrest 20, shown in FIG. 2a. When the piston 52 is moved by engagement with the B-pillar 24 or C-pillar 26, it displaces air which is then transferred to the cylinder 58 via the tubes 60,62.

Depending on the bore sizes and stroke differences of the cylinder 57 and the rotary actuator 58 any incremental movement of the piston 52 will automatically cause the same movement of the piston (not shown) housed within the rotary actuator 58.

In operation, the rod 52 protrudes from the side of the sliding door, and as the door is closed, the rod end 64 contacts the door frame and the internal piston within the cylinder 57 is moved. As the internal piston within the cylinder 57 is moved, it displaces air through the tubes 60,62 to the rotary actuator 58 and causes the rotary actuator 58 to move and rotate the armrest to the horizontal use position. When the door 10 is opened, the rod 52 is free to extend under the influence of its internal return spring, and the piston 52 now forces air into the other end of the rotary actuator 58, causing it to reverse direction and rotate the shaft 55 and armrest 20 to the stowed position.

Preferably, the cylinder 57 is a Model EFS-5075, "spring extend cylinder" available from Bimba Corporation of Monee, Ill. The rotary actuator 58 is preferably a single rack model PT-110180-A1DV from Bimba Corporation.

Figure 6:
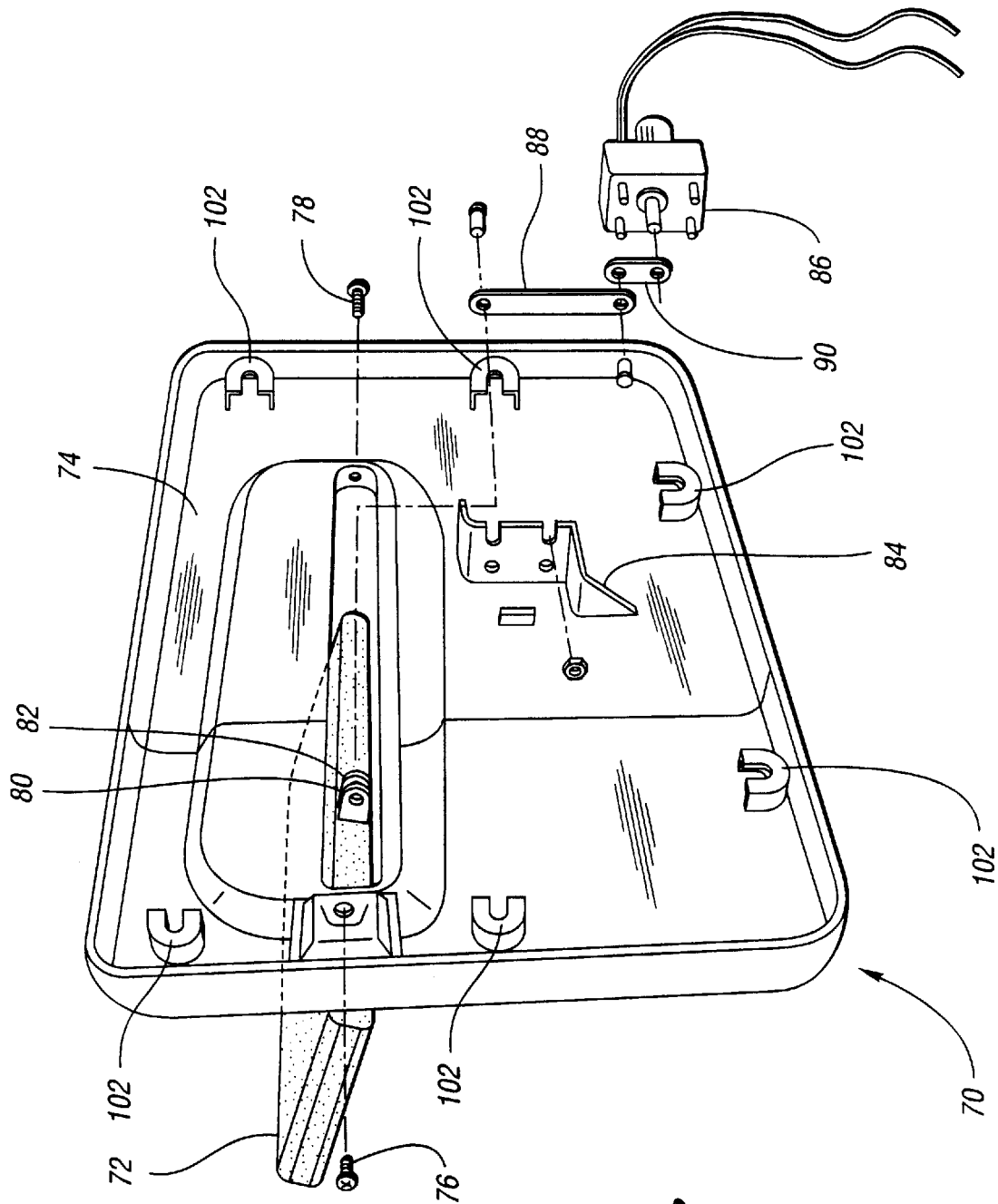
FIG. 6 shows an exploded perspective view of an actuator, armrest and door assembly in accordance with a second alternative embodiment of the invention.
Figure 7:
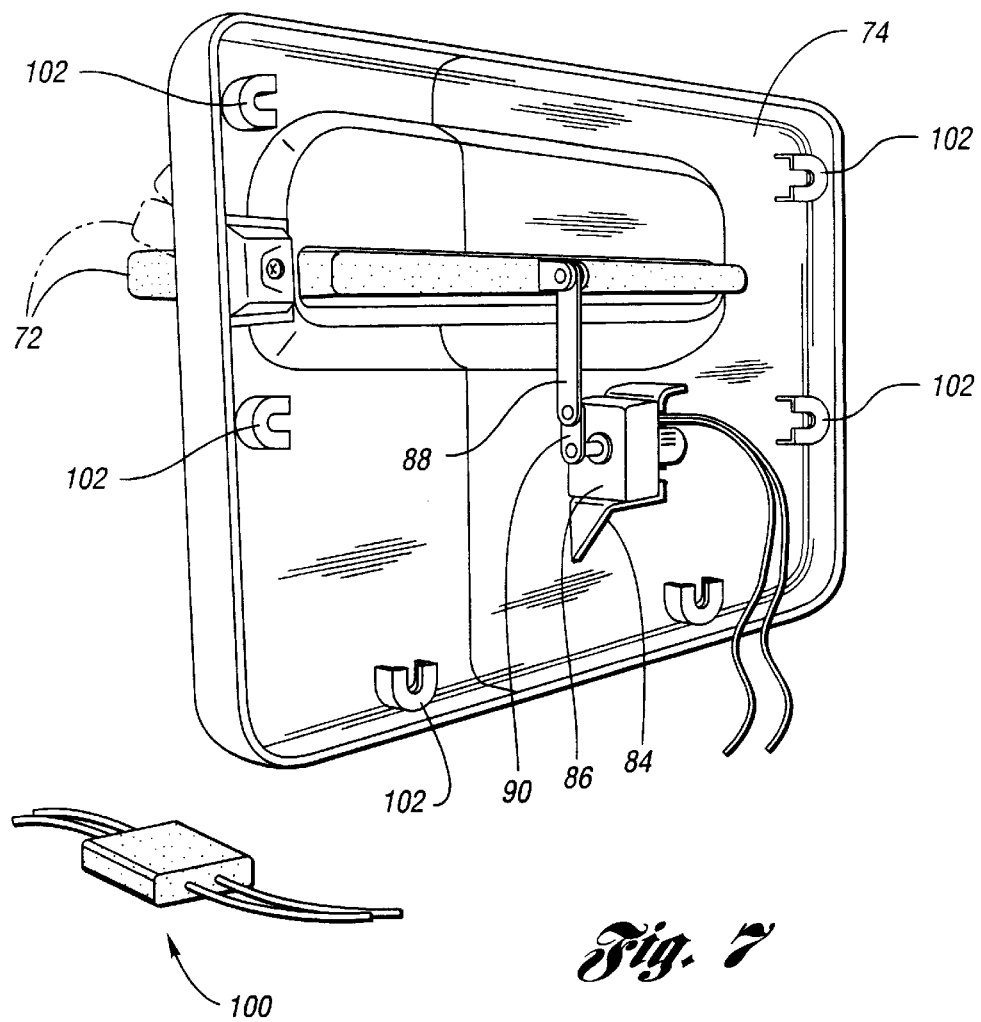
FIG. 7 shows an assembled view of the actuator, armrest and door assembly of FIG. 6.
Figure 8:
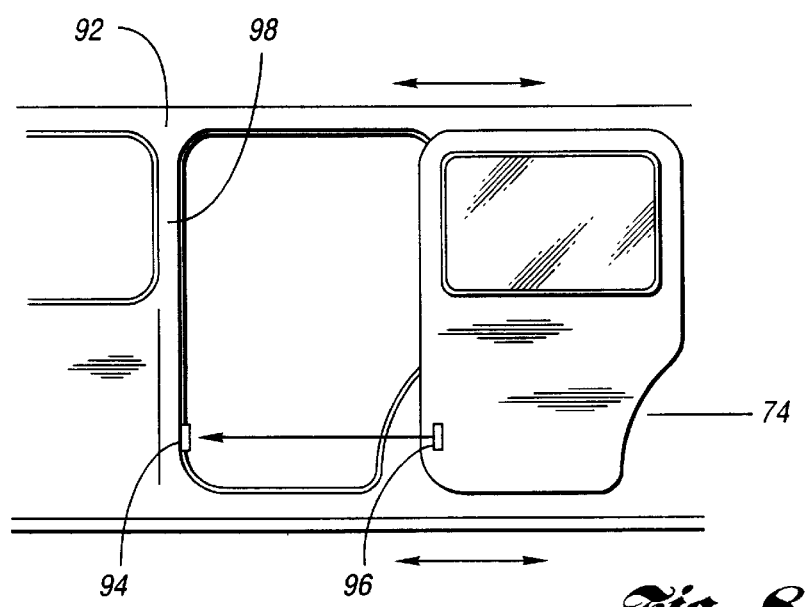
FIG. 8 shows a schematic side view of a sliding rear door attached to a vehicle body in accordance with the embodiment of FIGS. 6 and 7.

Referring to FIGS. 6–8, a second alternative embodiment of the invention is shown. In this embodiment, a door assembly 70 includes an armrest 72 pivotally connected to a door 74 along a pivot axis defined by fasteners 76,78 and attachment nuts 80,82. A bracket 84 attaches a d.c. motor 86 to the door 74 for rotatably driving the armrest 72 between upright and horizontal positions via the crank arms 88,90.

As shown in FIG. 8, the door 74 and vehicle body 92 are provided with mating electrical connectors 94,96. When the door 74 is closed against the B-pillar 98, the electrical connectors 94,96 are engaged to close a circuit which energizes the 12 volt d.c. motor 86 to automatically move the armrest 72 to the horizontal use position. The armrest 72 may be torsionally spring-loaded to return to the vertical position when the motor 86 is de-energized as the door 74 is opened, disengaging the connectors 94,96. A control box 100 may be provided for controlling armrest 72 movement via the electric motor 86. The control box 100 may to send a signal to the motor 86 to reverse the motor 86 to return the armrest 72 to the upright position when the door latch is released.

The views of FIG. 6 and 7 show the "B" side surface of the sliding door substrate 74. As illustrated, attachment features 102 are provided for connection to an adjacent door component.

While the best modes for carrying out the invention have been described in detail, those familiar with the art to which this invention relates will recognize various alternative designs and embodiments for practicing the invention within the scope of the appended claims. The words used herein and embodiments described are intended to be examples of the invention, which may take varying forms within the scope of the claims.

What is claimed is:

1. A vehicle comprising:
   a vehicle body;
   a sliding rear door movable in forward and rearward directions between open and closed positions with respect to the vehicle body, said rear door having a cavity formed therein;
   an armrest pivotally movable about a pivot axis between a horizontal position for use as an armrest and a vertical position for storage within the cavity, said pivot axis being substantially parallel to said forward and rearward directions; and
   wherein the armrest includes an actuator for automatically moving the armrest between the vertical and horizontal positions as the sliding rear door moves between the open and closed positions, respectively.

2. The vehicle of claim 1, wherein the vehicle includes a body component adjacent the sliding rear door, and the actuator comprises a pneumatic drive system having a protruding piston engageable with the body component when the sliding rear door is moved to the closed position for automatically actuating the rotation of the armrest about the pivot axis to the horizontal position.

3. The vehicle of claim 2, wherein the protruding piston is spring-biased toward an extended position corresponding with the armrest being in the vertical position so that the armrest automatically returns to the vertical position as the protruding piston disengages from the body component.

4. The vehicle of claim 2, wherein said body component comprises a B-pillar.

5. The vehicle of claim 2, wherein said body component comprises a C-pillar.

6. The vehicle of claim 1, wherein the actuator comprises a flexible drive cable engaged at one end with the armrest for pivoting the armrest as the flexible drive cable rotates, and connected at another end to a rotatable drive gear engageable with the vehicle body for rotating the flexible drive cable as the sliding rear door is moved forward and rearward.

7. The vehicle of claim 1, wherein the actuator comprises an electric motor operatively connected with two matable electrical connectors, one of the matable electrical connectors is attached to the sliding rear door, and the other of the matable electrical connectors is attached to the vehicle body such that when the matable electrical connectors engage, the electric motor is energized to automatically move the armrest to the horizontal position.

8. A sliding door assembly for a vehicle having a vehicle body, the sliding door assembly comprising:

a sliding door movable in forward and rearward directions with respect to the vehicle body between open and closed positions, said sliding door having a cavity formed therein;

an armrest pivotally movable about a pivot axis between a horizontal position for use as an armrest and a vertical position for storage within the cavity, said pivot axis being substantially parallel to said forward and rearward directions; and wherein the armrest includes an actuator for automatically moving the armrest between the vertical and horizontal positions as the sliding door moves between the open and closed positions, respectively.

9. The sliding door assembly of claim 8, wherein the actuator comprises a pneumatic drive system having a protruding piston engageable with the vehicle body when the sliding door is moved to the closed position for automatically actuating rotation of the armrest about the pivot axis to the horizontal position.

10. The sliding door assembly of claim 9, wherein the protruding piston is spring-biased toward an extended position corresponding with the armrest being in the vertical position so that the armrest automatically returns to the vertical position as the protruding piston disengages from the vehicle body.

11. The sliding door assembly of claim 8, wherein the actuator comprises a flexible drive cable engaged at one end with the armrest for pivoting the armrest as the flexible drive cable rotates, and connected at another end to a rotatable drive gear engageable with the vehicle body for rotating the flexible drive cable as the sliding door is moved forward and rearward.

12. The sliding door assembly of claim 8, wherein the actuator comprises an electric motor operatively connected with two matable electrical connectors, one of the matable electrical connectors is attached to the door, and the other of the matable electrical connectors is attached to the vehicle body such that when the matable electrical connectors engage, the electric motor is energized to automatically move the armrest to the horizontal position.

* * * * *